March 29, 1927.
H. S. CLARK
1,622,420
VEHICLE BRAKE DEVICE
Filed May 27, 1925
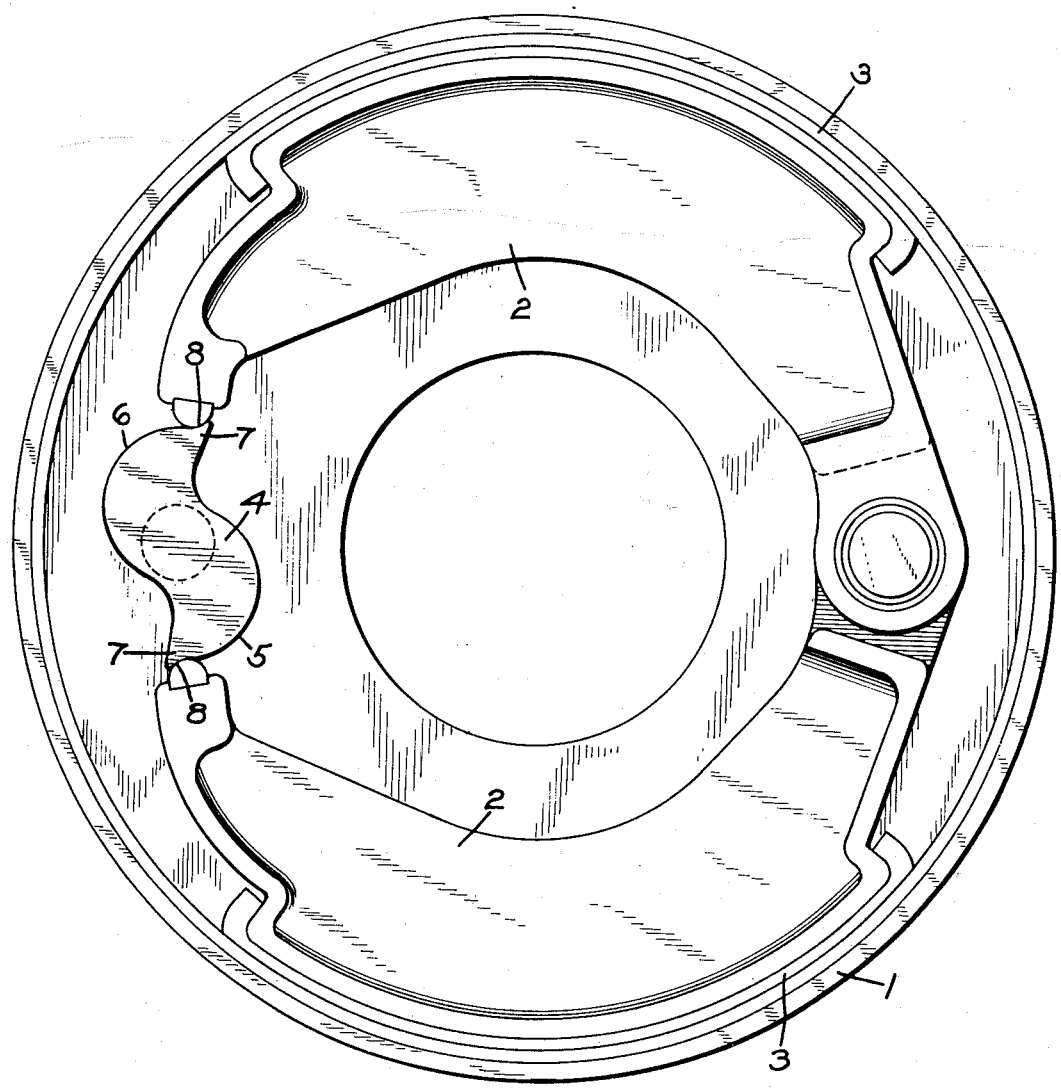
INVENTOR
HORACE S. CLARK
BY *Wm. M. Cady*
ATTORNEY Patented Mar. 29, 1927.

1,622,420

UNITED STATES PATENT OFFICE.

HORACE S. CLARK, OF OAKLAND, CALIFORNIA, ASSIGNOR TO THE WESTINGHOUSE AIR BRAKE COMPANY, OF WILMERDING, PENNSYLVANIA, A CORPORATION OF PENNSYLVANIA.

VEHICLE BRAKE DEVICE.

Application filed May 27, 1925. Serial No. 33,172.

This invention relates to vehicle brakes, and more particularly to a vehicle brake of the internal expanding drum type.

The internal expanding drum type of brake comprises a drum having an internal friction face and brake heads mounted within the drum and having brake shoes provided with friction faces adapted to engage the friction face of the drum. A cam is interposed between the free ends of the brake heads, which is adapted upon rotation thereof to expand the brake heads and thus cause the brake shoes to engage the brake drum.

As the shoes wear down in service, the cam must be rotated to a greater extent in order to cause the brake shoes to engage the brake drum, and finally a limit is reached at which the rotation of the cam will not be effective to cause the brake shoes to engage the brake drum with sufficient force to ensure the desired application of the brakes, and as a consequence, the operator may find that he has no brake, without any warning, as to the conditions.

The principal object of my invention is to provide means for warning the operator when the brake shoes have worn down to such an extent that the cam will not act to properly apply the brakes.

In the accompanying drawing, the single figure is a face view of an internal expanding drum brake embodying my invention.

As shown in the drawing, the brake may comprise a brake drum 1, having an internal friction face, brake heads 2, pivotally connected together at one pair of adjacent ends, and having brake shoes 3 provided with friction faces adapted to frictionally engage the internal friction face of the brake drum 1.

Interposed between the free ends of the brake heads 2 is a cam 4 having cam faces 5 and 6 adapted to engage the respective free ends of the brake heads 2, so that as the cam is rotated, the brake heads 2 are spread apart and the brake shoes 3 are caused to engage the friction face of the drum 1.

According to my invention, at the extreme tip end of each of the cam faces 5 and 6, a projecting portion 7 is provided, having a sharply rising face 8 adapted to be engaged by the free ends of the brake heads when the cam 4 is rotated to a sufficient extent.

When the brake shoes 3 have worn down to a degree such that it requires the rotation of the cam to the position shown in the drawing, further relative movement of the cam will still tend to effect a spreading action of the brake heads 2, so as to cause the brake shoes to engage the brake drum, but the sudden rapid rise in the cam face 8 causes a corresponding reduction in the lever ratio, such that the operator at once becomes aware that the brakes need attention, due to the fact that while he applies the usual force, only a weak brake is obtained and that he must apply a much greater force in order to secure the desired braking effort.

The operator will thus be warned that the brakes need attention and should be adjusted, or in case of worn brake shoes, that the brake shoes should be renewed. At the same time, the brakes are not lost, since the brakes can still be applied, though requiring a greater relative force for the purpose.

Having now described my invention, what I claim as new and desire to secure by Letters Patent, is:—

1. In a vehicle brake, the combination with brake heads, of a rotatable cam interposed between the free ends of said brake heads, said cam having a tip at the end of the cam providing a more abrupt cam face.

2. In a vehicle brake, the combination with brake heads, of a rotatable cam interposed between the free ends of said brake heads and having a cam face for engaging each of the free ends of said brake heads, each cam face terminating in a sharply rising cam face.

3. The combination with expansible brake members, of a rotatable cam for spreading said members having opposite wings, each provided with a cam face for engaging a corresponding brake member and adapted to exert a spreading action throughout a rotative movement of substantially 180° each cam face terminating in a raised portion for effecting a more abrupt spreading of the brake members.

In testimony whereof I have hereunto set my hand.

HORACE S. CLARK.